United States Patent
Engelhart (10) Patent No.: US 10,531,515 B1
(45) Date of Patent: Jan. 7, 2020

(54) DATA CHARGING DURING CHARGING FUNCTION OUTAGES

(71) Applicant: T-Mobile USA, Inc., Bellevue, WA (US)

(72) Inventor: Robert L. Engelhart, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/277,105

(22) Filed: Feb. 15, 2019

(51) Int. Cl.
*H04W 80/10* (2009.01)
*H04M 15/00* (2006.01)
*H04W 4/24* (2018.01)

(52) U.S. Cl.
CPC ........... *H04W 80/10* (2013.01); *H04M 15/66* (2013.01); *H04M 15/8214* (2013.01); *H04W 4/24* (2013.01)

(58) Field of Classification Search
CPC . H04M 15/66; H04M 15/8214; H04W 80/10; H04W 4/24
USPC ........................................................ 455/406
See application file for complete search history.

(56) References Cited

U.S. PATENT DOCUMENTS

| | | | | |
|---|---|---|---|---|
| 9,461,829 | B2 * | 10/2016 | Tornkvist | H04L 12/1435 |
| 2010/0304710 | A1 * | 12/2010 | Sharma | H04M 15/00 |
| | | | | 455/406 |
| 2014/0011472 | A1 * | 1/2014 | Sharma | H04L 12/1403 |
| | | | | 455/406 |
| 2014/0273932 | A1 * | 9/2014 | Sharma | H04M 15/65 |
| | | | | 455/406 |
| 2018/0124253 | A1 * | 5/2018 | Xu | H04W 4/24 |
| 2019/0014454 | A1 * | 1/2019 | Garcia Martin | H04M 15/66 |

OTHER PUBLICATIONS

3GPP TS 32.240 V15.4.0 (Dec. 2018) (Year: 2018).*
3GPP TS 32.296 V15.0.0 (Jun. 2018) (Year: 2018).*
3GPP TS 32.255 V15.1.0 (Dec. 2018) (Year: 2018).*

* cited by examiner

*Primary Examiner* — William Nealon
(74) *Attorney, Agent, or Firm* — Lee & Hayes, P.C.

(57) ABSTRACT

In a $5^{th}$-Generation (5G) cellular communication network, charging customers for data usage is performed by a network function referred to as a charging function (CHF). A session management function (SMF) of the network repeatedly sends update requests to reserve additional data for a data session. If the CHF is not available and the SMF does not receive a response to an update message, the SMF continues to assign data for the data session, even though it has not received authorization to do so from the CHF. When the CHF becomes available, the SMF sends a request to start a second data session to continue the data connection that was previously supported by the original data session. This request specifies the amount of data that was used in the original data session without being confirmed by the CHF, allowing the CHF to account for this data usage.

20 Claims, 5 Drawing Sheets

DATA CHARGING DURING CHARGING FUNCTION OUTAGES

BACKGROUND

A 5th-Generation (5G) core network is based on services that are referred to as network functions (NFs). An NF is a software-implemented component that provides a network-related service such as routing, mobility management, session management, authorization, policy control, and so forth.

Session management in a 5G system is performed by a network function called a session management function (SMF). The SMF coordinates with another network function, called a charging function (CHF), to implement billing to subscriber accounts. While managing a data connection, the SMF repeatedly queries the CHF to reserve data units for the data connection and to report the amount of data that has been used by the data connection. The CHF communicates with the carrier's billing system to enter charges based on the reported amounts of consumed data.

At times, however, the CHF may be unavailable, due to issues such as network failure or congestion, equipment malfunctions, software crashes, etc. During times that the CHF is unavailable, the SMF is unable to reserve data units, and as a result may terminate the data connection, creating an undesirable customer experience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques are described herein for providing uninterrupted communication services to user equipment (UE) despite failures to communicate with a charging function (CHF), while also allowing the CHF to correct usage charges. In particular, a session management function (SMF) of a 5th-Generation (5G) cellular communication network is configured to continue service after an outage of a CHF. The SMF records the amount of data used during the outage and reports it when able to again communicate with the CHF.

To start a data connection with the UE, the SMF sets up a first data session, which is identified by a corresponding first data session identifier. While managing the first data session, the SMF periodically queries the CHF to both report data usage and to request additional data for the first data session. Initially, the SMF sends what is referred to as a charging data initial request, which requests a specified number of data units for use by a new data session. Periodically thereafter, the SMF sends what are referred to as charging data update requests, which report actual data usage and request additional data units for the first data session. The request and the response both specify the first data session identifier to indicate that they relate to the first data session.

The CHF responds to each charging data update request with a charging data update response. The charging data update response acknowledges the receipt of the reported data usage and specifies a number of data units that are granted for additional use by the first data session. The CHF also records the appropriate charges.

If a charging data update response is not received in response to a charging data update request, the SMF maintains the first data session while waiting for the CHF to become available. During this time, the SMF repeatedly assigns additional data units for use by the data connection. These data units, however, are not reported to the CHF at this point. Data assigned by the SMF in this way is referred to herein as unconfirmed data, because the SMF does not at this point receive any confirmation from the CHF that the data usage has been recorded.

When the CHF becomes available again, the SMF sends another charging data initial request, rather than a charging data update request, to request additional data for a new, second data session for the original data connection, which was maintained uninterrupted by the SMF during the CHF outage. In addition, the charging data initial request specifies information allowing the CHF to record any previously unconfirmed data usage. Specifically, the charging data initial request specifies the session identifier of the original, first data session and the amount of data that was used for the original data session but not confirmed by the CHF. In some cases, the charging data initial request may also specify other information from which the CHF can determine whether any of this newly reported data usage has already been charged.

Upon receiving a charging data initial request such as this, the CHF first determines whether the unconfirmed data has in fact already been charged in conjunction with the original data session. If not, the CHF charges the reported unconfirmed data to the original data session and grants further data as appropriate for the new data session.

Figure 1:
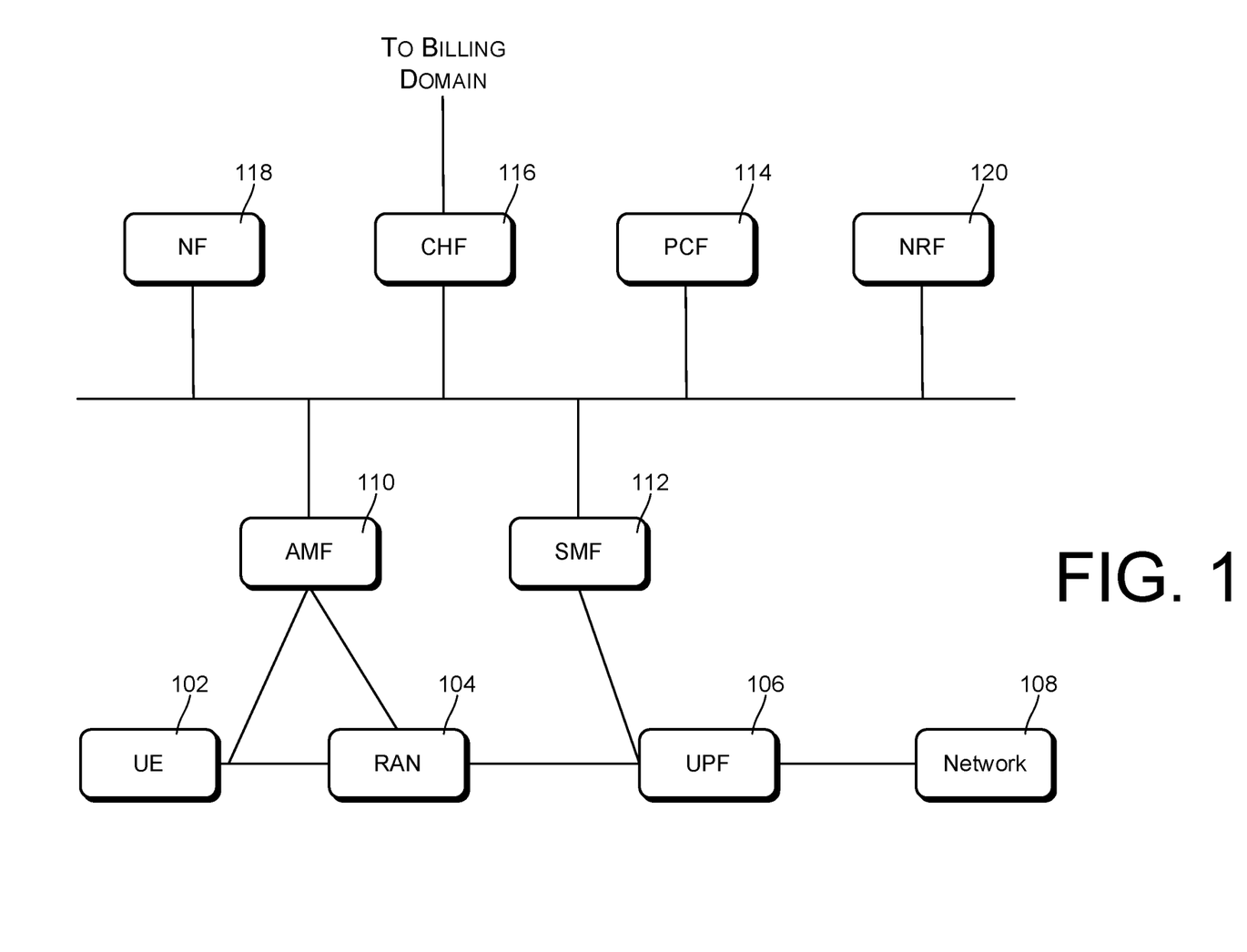
FIG. 1 is a block diagram illustrating certain components of a 5th-Generation (5G) cellular communication network.

FIG. 1 shows components of a cellular communication system that are most relevant to the techniques described herein. In FIG. 1, a user equipment (UE) 102 communicates through a radio access network (RAN) 104, through a user plane function (UPF) 106, to a data network 108. The RAN 104 provides a wireless interface for the UE 102. The UPF 106 provides packet inspection and routing, rule enforcement, traffic usage reporting, quality of service (QoS) handling, etc. The data path to and from the UE 102 is referred to herein as a data connection.

An access and mobility management function (AMF) 110 manages UE related functions, such as registration management, connection management, mobility management, access authentication, access authorization, SMS transport, etc.

A session management function (SMF) 112 performs session management, such as establishing, modifying, and releasing sessions, IP address allocation and management, traffic steering, charging data management and collection, etc.

A policy control function 114 supports a policy framework to govern network behavior, provides policy rules, accesses subscription information, and so forth.

A charging function (CHF) 116 provides charging services to the SMF and other network functions (NFs) 118. The charging function 116 interfaces with the carrier's billing domain to record charges for accounting purposes.

A network repository function (NRF) 120 performs service discovery and registration.

Figure 2:
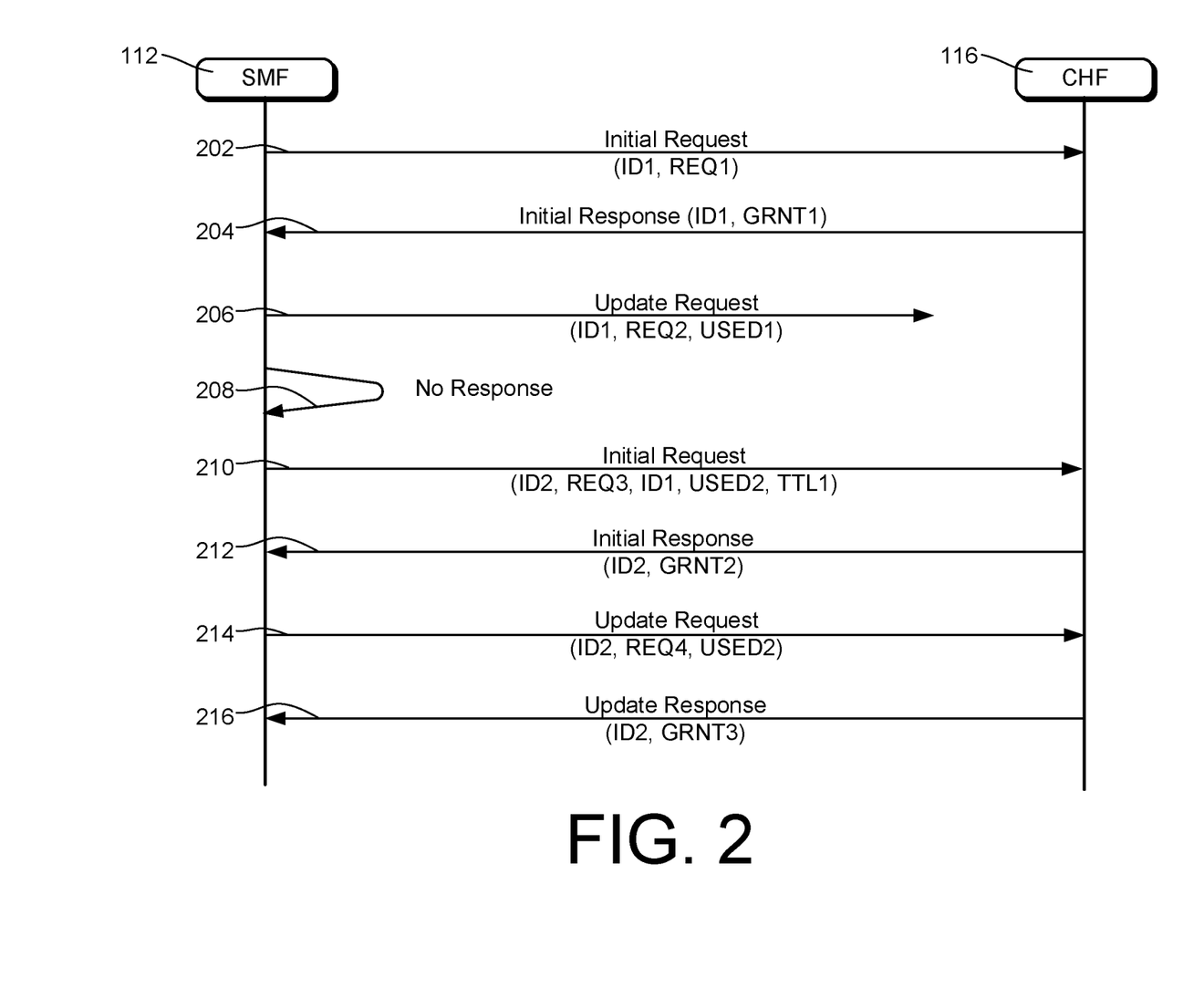
FIG. 2 is a diagram illustrating an example call flow for charging data update requests and charging data initial requests.

FIG. 2 illustrates an example high-level call flow that may be implemented in certain embodiments for tracking and recording data usage in a cellular communication network such as a $5^{th}$-Generation wireless network. In FIG. 2, communicating components or entities are listed along the top, with respectively corresponding vertical lines extending downward. Communications are indicated by arrows that extend from and to the vertical lines corresponding to the entities from which the communications originate and terminate, respectively. Communications occur in order from top to bottom. An individual communication or set of communications is indicated by a corresponding reference numeral along the left side of the figure, horizontally aligned with the arrow or arrows representing the communication. Note that FIG. 2 illustrates the most relevant communications and may omit other communications that occur in practice but are less relevant to the topics at hand. Such other communications may include communications that both precede and follow the illustrated communications, communications that occur in time between the illustrated communications, and communications that occur between components or entities that are not specifically shown.

At 202, the SMF 112 sends a charging data initial request to the CHF 116, requesting authorization to start a data session for the UE 102. Among other information, the charging data initial request (referred to below as an initial request) specifies a session identifier ID1 corresponding to the current data session with the UE. The initial request may also specify a number of data units REQ1 that the SMF 112 is requesting to be reserved for the data session.

At 204, the CHF 116 sends a charging data initial response (referred to below as an initial response). The initial response specifies and is associated with the session identifier ID1 and specifies a number of data units GRNT1 that the CHF is granting for use by the current data session.

Charging data initial requests and responses of this type are described in 3GPP TS 32.290 and the references cited therein.

After initiating the data session charging, at 206 the SMF 112 sends a charging data update request (referred to below as an update request) to request addition data units to be reserved for the current data session. The update request specifies the session identifier ID1 of the current data session. The update request also specifies a number of additional data units REQ2 that the SMF 112 is requesting to be reserved for the current data session. In addition, the update request specifies the number of data units USED1 that were used in the data session, as authorized by a previous initial request or update request.

The purpose of specifying the used data units USED1 is to allow the CHF 116 to charge for the used data units. In this case, however, the CHF 116 fails to respond to the update request, as indicated by the returning arrow at 208. This could be because of a network failure, network congestion, the CHF 116 crashing, or any other cause.

Note that any number of update requests may be sent, and corresponding responses received, before encountering the situation where an update response is not received.

Charging data update requests and responses of the type described herein are specified in 3GPP TS 32.290.

Because of the failure to receive a response to the update request, the SMF 112 is unable to determine whether the reported data usage USED1 was recorded and charged by the CHF 116. However, during this time the SMF 112 continues to allocate new data units and records their usage so that they can be eventually reported to the CHF 116.

At 210, the CHF 116 has again become available and the SMF sends a new charging data initial request. This request specifies a new session identifier ID2, because the original session identifier ID1 may no longer be available in the CHF, and a number of additional data units REQ3 that are being requested for use in a new data session corresponding to the new session identifier ID2. In addition, this initial request specifies ID1, the session identifier of the original data session, and two other parameters relating to the consumption of data attributable to the original data session. In particular, a parameter USED2 specifies how many unconfirmed data units were consumed by the data connection, and associated with the original data session, during the time that the CHF was unavailable. This potentially includes the used units USED1 as well as additional units that were subsequently used without confirmation by the CHF 116. In addition, a parameter TTL1 specifies the total number of data units used in the original data session. TTL1 allows the CHF 116 to determine whether or not the USED1 units were already recorded and/or billed. In some cases, for example, the used data units USED1 may have been recorded by the CHF 116, even though no response was received by the SMF 112 from the CHF 116.

The CHF 116 receives the information regarding the original data session and adjusts billings for that data session as appropriate. Specifically, the CHF 116 records the reported USED1 units if it is determined that they have not already been accounted for.

At 212, in response to the preceding charging data initial request, the CHF sends a charging data initial response (referred to herein as an initial response) to the SMF 112. This response specifies and is associated with the session identifier ID2 of the new data session. This response also specifies a number of data units GRNT2 that are granted for use by the new data session. This action confirms that all previously used units were recorded and applied appropriately. In the case that the USED2 units were already recorded then no errors are sent by the CHF. In the case that the USED2 units exceed account limitations, the CHF responds with an error, terminating the session, and recording the USED2 units for post processing offline. In another embodiment, the CHF may allow negative balances in the account, recuperating them on a subsequent account refill—whether automatic or manual. In another embodiment, the CHF may redirect the subscriber to an account refill page. Once account replenishment has occurred the negative balance or USED2 units may be deducted from the account and the data service can continue. Not all possible error conditions and corrections are covered here, but can be envisioned by one skilled in the art of data charging.

Further charging data update requests and responses may follow. For example, at 214 the SMF 112 sends an update request specifying the session identifier ID2 of the new session, a requested number of data units REQ4, and a number of used data units USED2. At 216, the CHF 116 sends an update response specifying the session identifier ID2 and a number of granted data units GRNT3. Updates may continue for the duration of the data connection with the UE 102.

Figure 3:
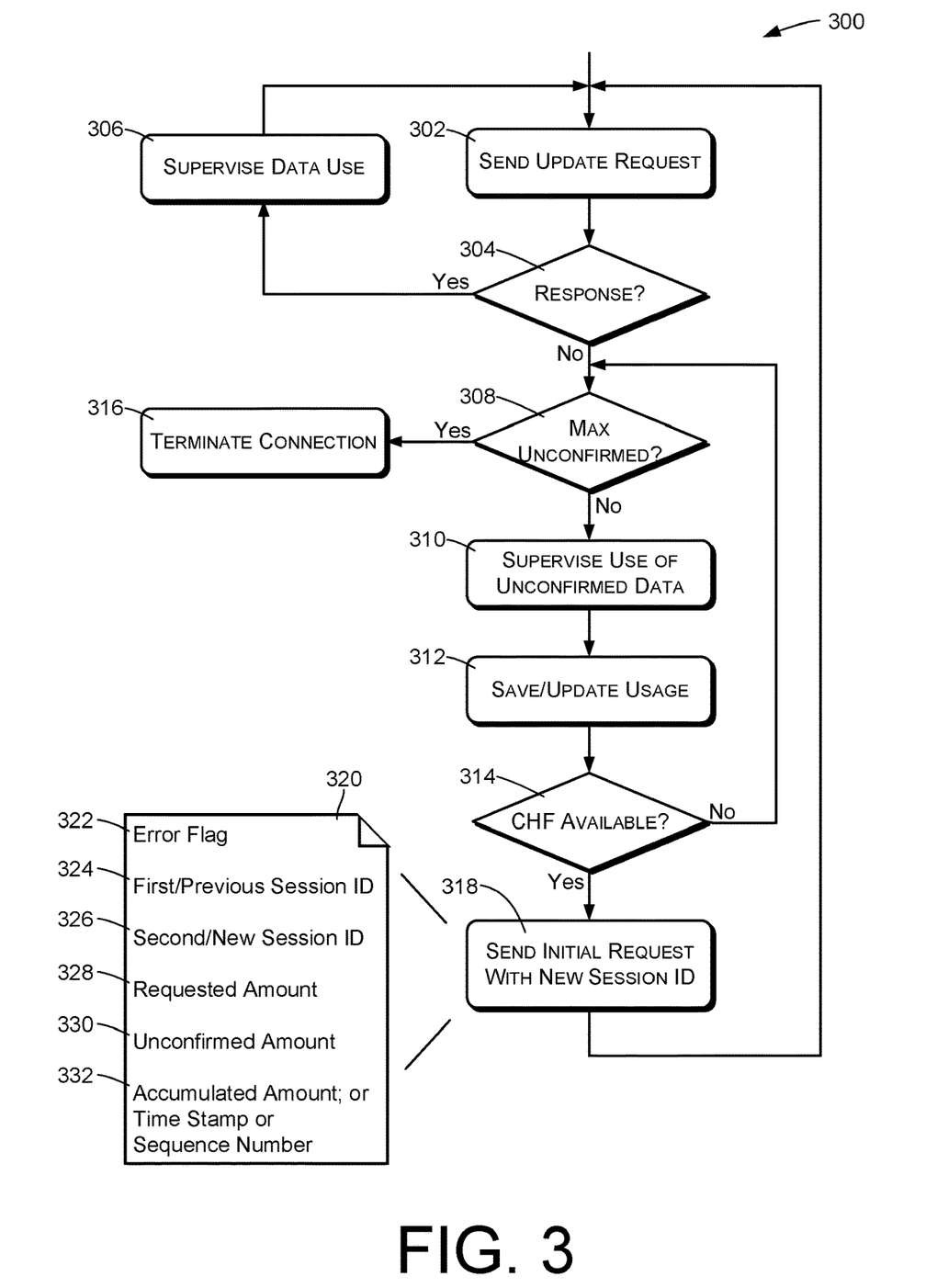
FIG. 3 is a flow diagram illustrating an example method that may be performed by a session management function (SMF) when interacting with a charging function (CHF).

FIG. 3 illustrates an example method 300 that may be performed by a session management function (SMF) of a cellular communication network such as a $5^{th}$-Generation (5G) mobile network. In a described embodiment, the method 300 may be performed by the SMF 112 of FIG. 1.

FIG. 3 assumes that there is already an active data connection with the UE 102 and that a charging data initial request has already been processed and responded to by the CHF. One or more charging data update requests may also have been successfully processed and responded to by the CHF.

An action 302 comprises sending a charging data update request to the CHF. The update request specifies a first data session identifier, which corresponds to a first data session (also referred to herein as the original data session) that is established for the associated data connection. The update request also specifies an amount of requested data for the original data session and an amount of data that has been used by the original data session. The amount of used data in this case indicates how much data was used, by the original data session, of the most recent previous grant from the SMF.

An action 304 comprises determining whether a charging data update response is received from the CHF. An update response from the CHF serves to acknowledge that the reported amount of used data has been accounted for by the CHF. The update response also specifies the first data session identifier and a granted amount of data for use by the first data session.

In response to receiving the update response, an action 306 is performed, comprising normal supervision by the SMF of the first data session, including the use by the data connection of data granted by the CHF for the first data session. The action 302 of sending the update request is repeated as the data connection needs more data.

If the SMF fails to receive a valid charging data update response within a time-out period, an action 308 is performed. The action 308 comprises determining whether at least a predetermined maximum or threshold amount of unconfirmed data attributable to the first data session has been used by the data connection. Unconfirmed data is data that has been assigned to the UE data connection as part of the first data session but has not been acknowledged by any update response from the CHF. The action 308 will be described in more detail below.

If a predetermined maximum or threshold amount of unconfirmed data has not yet been used by the data connection, an action 310 is performed. The action 310 comprises supervising usage of unconfirmed data while the CHF is unavailable. In some cases, the action 310 may comprise repeatedly assigning additional data units for use by the data connection as extensions of the first data session.

An action 312, performed in conjunction with the action 310, comprises saving and/or updating saved information relating to unconfirmed data usage by the data connection. This information may include the amount of unconfirmed data that has been used by the data connection. The information may also include the total amount of data used by the data connection in association with the first data session. Alternatively, or in addition, the information may include a timestamp or sequence number of the update request to which a response was not received.

An action 314 comprises determining whether the CHF has become available. If it has not, the preceding actions, starting at the action 308, are repeated. Availability of the CHF may be determined, for example, by execution of link recovery procedures in the SMF, i.e. re-establishing the persistent HTTP connection with the CHF. Alternatively, a network repository function (NRF) may be configured to notify the SMF when the CHF becomes available.

As mentioned above, the action 308 comprises determining whether at least a predetermined and/or configurable maximum amount of unconfirmed data has been used by the data connection. In some embodiments, the action 308 may comprise determining whether the total amount of unconfirmed data used by the data connection has exceeded a threshold amount. Alternatively, the action 308 may comprise determining that the action 310 of assigning unconfirmed data has been repeated at least a predetermined maximum number of times. If the action 308 determines that the predetermined maximum amount of unconfirmed data has been used by the data connection, an action 316 is performed of terminating the data connection with the UE.

In response to determining that the CHF has become available in the action 314, an action 318 is performed. The action 318 comprises sending a charging data initial request to the CHF. The initial request specifies information 320 that allows the CHF to bill for any unconfirmed data that was used by the data connection and that has not already been billed.

In described embodiments, the information 320 includes an error flag 322, indicating that this initial request is associated with a previous data session; a first data session identifier 324, of the previous, original data session; a second data session identifier 326, of a newly created data session (i.e., the second data session) to be associated with the data connection; an amount 328 of requested data; an amount 330 of unconfirmed data that is associated with the original data session and the original session ID, and that was used for the data connection; and one or more properties 332 from which the CHF can determine how much of the reported unconfirmed amount 330 has already been accounted for. These items of the information 320 are embedded in control messaging over a Service Based Interface (SBI). The information 320 may be formatted using JavaScript Object Notation (JSON) or using other data formats.

The one or more properties 332 may include, for example, a total amount of data consumed by the data connection in association with the first data session and the first data session identifier, so that the CHF can make sure that none of the amount 330 of unconfirmed data has already been accounted for. As another example, the one or more properties 332 may include a time or a sequence number associated with the earlier update request for which no response was received (i.e., the most recent request sent in the action 302), so that the CHF can determine whether it did in fact process the earlier update request and account for the used data reported by the earlier update request.

After sending the initial request in the action 318, the method 300 repeats, starting at the action 302, for the duration of the data connection.

Figure 4:
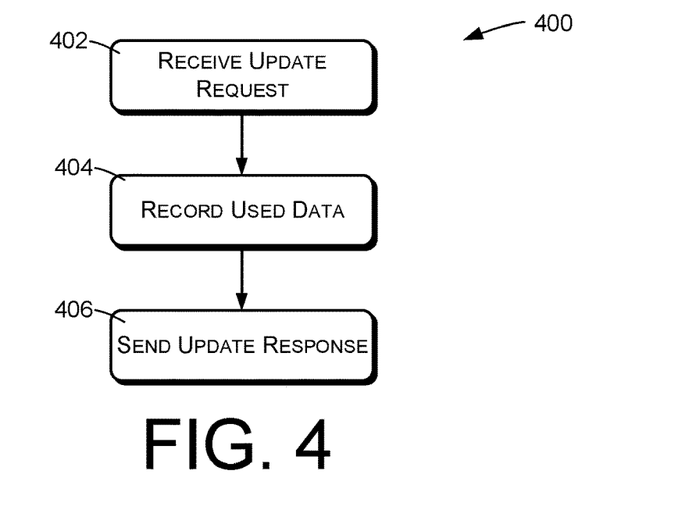
FIG. 4 is a flow diagram illustrating an example method that may be performed by a CHF for processing charging data update requests.

FIG. 4 illustrates an example method 400 that may be performed by a charging function (CHF) of a cellular communication network, such as a $5^{th}$-Generation (5G) wireless network, to respond to charging data update requests.

An action 402 comprises receiving a charging data update request. In described embodiments, the update request is received from a session management function (SMF). The update request specifies (a) a data session, identified by its session identifier, (b) an amount of data that has been used by the data session, and/or (c) an amount of additional data that is requested for use by the data session.

An action 404 comprises recording the amount of data used by the data session for charging in association with the specified data session. An action 406 comprises sending a charging data update response to the requesting SMF, indicating an amount of additional data that is granted for use by the data session. The charging data update response also serves to acknowledge that the CHF has processed the reported data usage associated with the data session.

Figure 5:
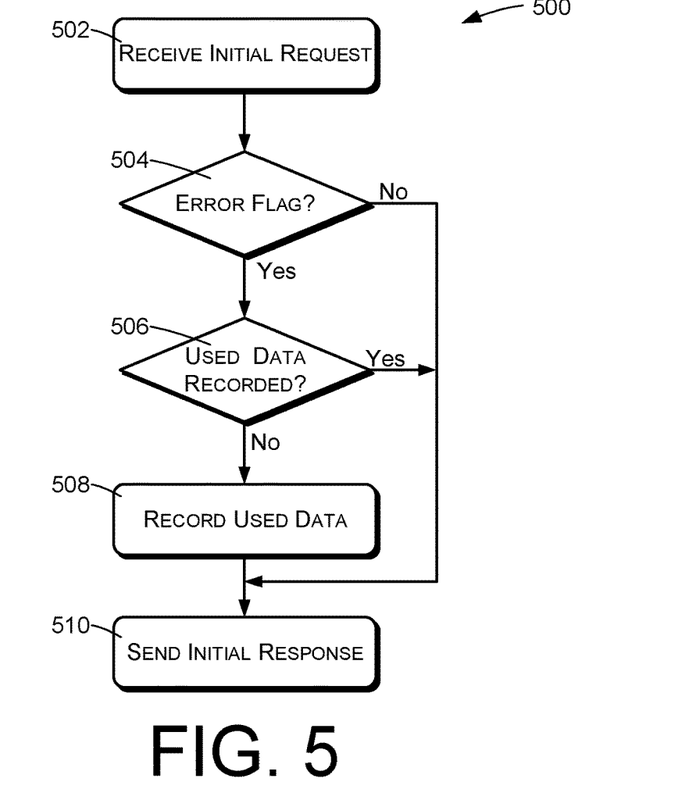
FIG. 5 is a flow diagram illustrating an example method that may be performed by a CHF for processing charging data initial requests.

FIG. 5 illustrates an example method 500 that may be performed by a charging function (CHF) of a cellular communication network, such as a $5^{th}$-Generation (5G) wireless network, to respond to charging data initial requests.

An action 502 comprises receiving a charging data initial request. In described embodiments, the initial request is received from a session management function (SMF). The initial data request specifies at least some of the information 320 described above with reference to FIG. 3. In particular, the initial request specifies a new data session, identified by a session identifier, and a requested amount of data for use by the new data session. In some cases, as indicated by the presence of an error flag, the initial request may contain additional information.

An action 504 comprises determining whether the initial request specifies an error flag, such as the error flag 322 of FIG. 3. The presence of an error flag indicates that there was a failure by the SMF to receive a response to one or more previous charging data update requests that were sent to the CHF. In addition, the error flag indicates that the initial request specifies further information, such as remaining items of the information 320. In particular, an error flag may indicate that the initial request specifies (a) a session identifier that identifies a previous data session, (b) an amount of unconfirmed data that was used by the previous data session without being confirmed by the CHF, and/or (c) a property from which the CHF can determine how much of the reported unconfirmed data has already been accounted for. As an example, this property may comprise the total amount of data used in the previous data session. As another example, the property may correspond to a time associated with a previously occurring charging update request for which the SMF did not receive a response. As another example, the property may correspond to a sequence number of a previously occurring charging update request for which the SMF did not receive a response. An error flag may be a unique attribute, or the presence of the USED2 attribute may itself indicate a previous error, implicitly.

If an error flag or other error indication is present in the initial request, an action 506 is performed. The action 506 comprises determining whether the amount of unconfirmed data reported by the initial request as being used in the first data session was in fact already recorded by the CHF. This may happen, for example, if the CHF received and responded to an update request but the response was not received by the SMF.

The action 506 may be performed in different ways, depending on the information provided in the initial request. If the initial request specifies a total amount of data used in the first data session, the CHF compares this amount to the data actually recorded by the CHF. If the recorded amount is the same as the total amount specified in the initial request, the CHF concludes that the amount of data being reported as unconfirmed has in fact already been recorded. If the recorded amount is less than the total amount specified in the initial request, the CHF concludes that not all of the reported total amount was recorded.

If the initial request instead specifies a time or sequence number associated with a previous update request for which a response was not received by the SMF, the CHF determines whether an update request having this time or sequence number was already received and processed by the CHF. Note that this assumes that the CHF keeps a record of the timestamps or sequence numbers of received update requests, or at least of the most recent update request for each data session.

If the reported amount of unconfirmed data has not been already recorded, an action 508 is performed of recording this amount for charging. The CHF then performs an action 510 of sending a charging data initial response to the SMF. The initial response specifies an amount of additional data that is granted for use by the new data session.

If it is determined in the action 504 that the initial request does not include an error flag or other indication that there was a previous failure by the SMF to receive an update response, or if the unconfirmed data reported by the initial request has in fact already been recorded, the action 510 is performed of sending the initial response. In this case, the action 508 of recording unconfirmed data is not performed.

Figure 6:
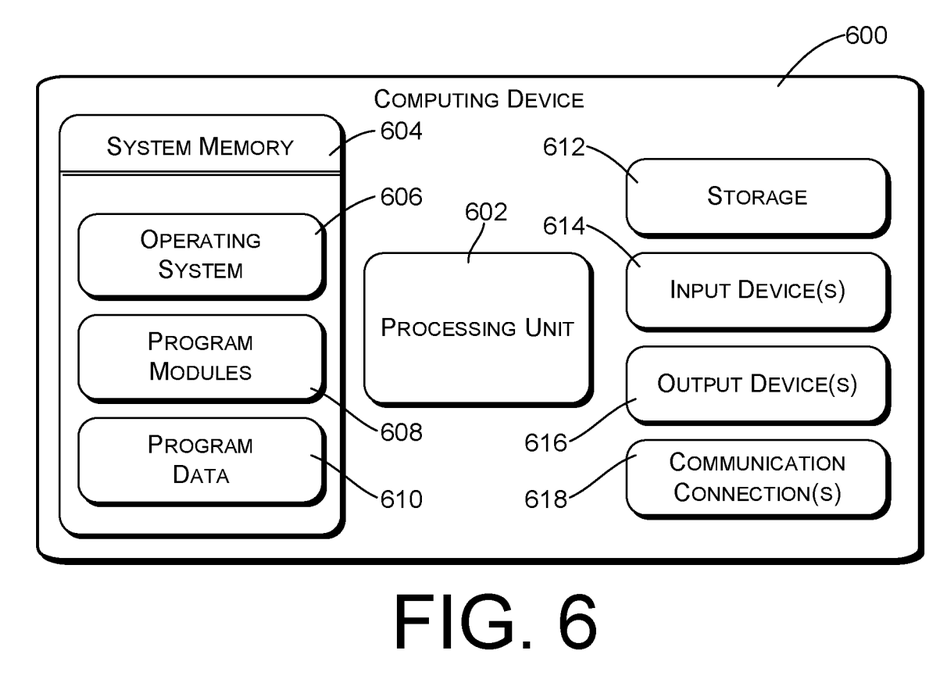
FIG. 6 is a block diagram of an example computing device that may be used to implement the functionality described herein.

FIG. 6 shows an illustrative computing device 600 such as may be used to implement the various network functions described herein, such as the AMF 110, the SMF 112, the CHF 116, and others. In various embodiments, the computing device 600 may include at least one processing unit 602 and system memory 604. Depending on the exact configuration and type of computing device, the system memory 604 may be volatile (such as RAM), non-volatile (such as ROM, flash memory, etc.) or some combination of the two. The system memory 604 may include an operating system 606, one or more program modules 608, and may include program data 610.

The computing device 600 may also include additional data storage devices (removable and/or non-removable) such as, for example, magnetic disks, optical disks, or tape. Such additional storage devices are illustrated in FIG. 6 as storage 612.

Non-transitory computer storage media of the computing device 600 may include volatile and nonvolatile, removable and non-removable media, implemented in any method or technology for storage of information, such as computer readable instructions, data structures, program modules, or other data. The system memory 604 and storage 612 are all examples of computer-readable storage media. The term "non-transitory", as used herein, is a characterization of the medium itself (i.e., not a propagating electromagnetic signal) and does not imply any limitation with regard to data storage persistency.

Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 600. Any such non-transitory computer-readable storage media may be part of the computing device 600.

The computing device 600 may also use non-volatile cloud-based storage, and any of the components shown as being in the storage 612 may also, or alternatively, be stored on Internet-based or other network-based storage devices.

The computing device may be a virtual machine, container, or other software defined entity. It may also be a physical, non-virtual, computing unit that runs a software component, i.e. a bare-metal system.

In various embodiment, any or all of the system memory 604 and storage 612 may store programming instructions which, when executed, implement some or all of the function functionality described above.

The computing device 600 may also have input device(s) 614 such as a keyboard, a mouse, a touch-sensitive display, voice input device, etc. Output device(s) 616 such as a display, speakers, a printer, etc. may also be included. The computing device 600 may also have communication connections 618 that allow the device to communicate with other computing devices.

Although features and/or methodological acts are described above, it is to be understood that the appended claims are not necessarily limited to those features or acts. Rather, the features and acts described above are disclosed as example forms of implementing the claims.

What is claimed is:

1. A method performed by a session management Function (SMF) of a cellular communication network, the method comprising:
   sending a first charging data request to a charging function (CHF) of the cellular communication network, the first charging data request specifying (a) a first data session associated with a data connection and (b) a first amount of data used by the data connection and associated with the first data session;
   determining that a charging data response was not received from the CHF;
   assigning a second amount of data for the data connection in association with the first data session;
   determining that the CHF has become available; and
   in response to determining that the CHF has become available, sending a second charging data request to the CHF, wherein the second charging data request specifies (a) a second data session to be associated with the data connection, (b) the first data session, and (c) a third amount of data used by the data connection and associated with the first data session.

2. The method of claim 1, wherein the first charging data request is a charging data update request and the second charging data request is a charging data initial request.

3. The method of claim 1, wherein the third amount of data corresponds to how much data was used by the data connection without confirmation by the CHF.

4. The method of claim 1, wherein the third amount of data corresponds to a total amount of data used by the data connection in association with the first data session.

5. The method of claim 1, further comprising:
   determining that an amount of data that was used by the data connection without confirmation by the CHF exceeds a configurable amount; and
   terminating the data connection in response to determining that the amount of data that was used by the data connection without confirmation by the CHF exceeds the configurable amount.

6. The method of claim 1, wherein the second charging data request indicates that there was a failure to receive a response to one or more charging data requests.

7. The method of claim 1, wherein the second charging data request further specifies a time associated with a previous charging data request to which a response was not received.

8. The method of claim 1, wherein the second charging data request further specifies a sequence number of a most previous data request to which a response was not received.

9. One or more non-transitory computer-readable media storing computer-executable instructions for implementing a session management function (SMF) of a cellular communication network, wherein executing the instructions by one or more processors causes the one or more processors to perform actions comprising:
   sending a charging data update request to a charging function (CHF) to request a first amount of data for use by a data connection in association with a first data session, wherein the charging data update request specifies a first data session identifier;
   determining that a charging data update response was not received from the CHF;
   assigning a second amount of data for the data connection;
   determining that the CHF has become available; and
   in response to determining that the CHF has become available, sending a charging data initial request to the CHF, wherein the charging data initial request specifies (a) a second data session to be associated with the data connection, (b) the first data session, (c) a third amount of data used by the data connection, (d) a property from which the CHF can determine how much of the third amount of data has been accounted for, and (e) a fourth amount of requested data for use by the data connection in association with the second data session.

10. The one or more non-transitory computer-readable media of claim 9, wherein the third amount of data corresponds to how much data was used by the data connection without confirmation by the CHF.

11. The one or more non-transitory computer-readable media of claim 9, wherein the property comprises a total amount of data used by the data connection in association with the first data session.

12. The one or more non-transitory computer-readable media of claim 9, wherein the property comprises a time associated with the charging data update request.

13. The one or more non-transitory computer-readable media of claim 9, wherein the property comprises a sequence number of the charging data update request.

14. The one or more non-transitory computer-readable media of claim 9, wherein the charging data initial request indicates that there was a failure to receive a response to the charging data update request.

15. A method performed by a charging function (CHF) of a cellular communication network, the method comprising:
   receiving a first charging data update request specifying (a) a first data session and (b) a first amount of data used in the first data session;
   recording the first amount of data for charging in association with the first data session;
   receiving a charging data initial request specifying (a) a second data session, (b) a second amount of data used in the first data session, and (c) a third amount of data requested for the second data session; and
   recording the second amount of data for charging in association with the first data session.

16. The method of claim 15, wherein the charging data initial request further specifies a total amount of data used in the first data session.

17. The method of claim 15, wherein the second amount of data corresponds to an amount of data that was used without being confirmed by the CHF.

18. The method of claim 15, wherein:
the second amount of data corresponds to an amount of data that was used without being confirmed by the CHF;
the charging data initial request further specifies a total amount of data used in the first data session;
the method further comprising determining that not all of the total amount of data was recorded; and
wherein recording the second amount of data is performed in response to determining that not all of the total amount of data was recorded.

19. The method of claim 15, wherein;
the charging data initial request further specifies a time associated with a second charging data update request;
the method further comprising determining, based at least on the time, that the second charging data update request was not received; and
wherein recording the second amount is performed in response to determining that the second charging data update request was not received.

20. The method of claim 15, wherein;
the charging data initial request further specifies a sequence number associated with a second charging data update request;
the method further comprising determining, based at least on the sequence number, that the second charging data update request was not received; and
wherein recording the second amount of data is performed in response to determining that the second charging data update request was not received.

* * * * *